Jan. 28, 1936.                J. H. SHERTS                 2,028,928
                    APPARATUS FOR MAKING LAMINATED GLASS
                  Filed April 28, 1934        5 Sheets-Sheet 1
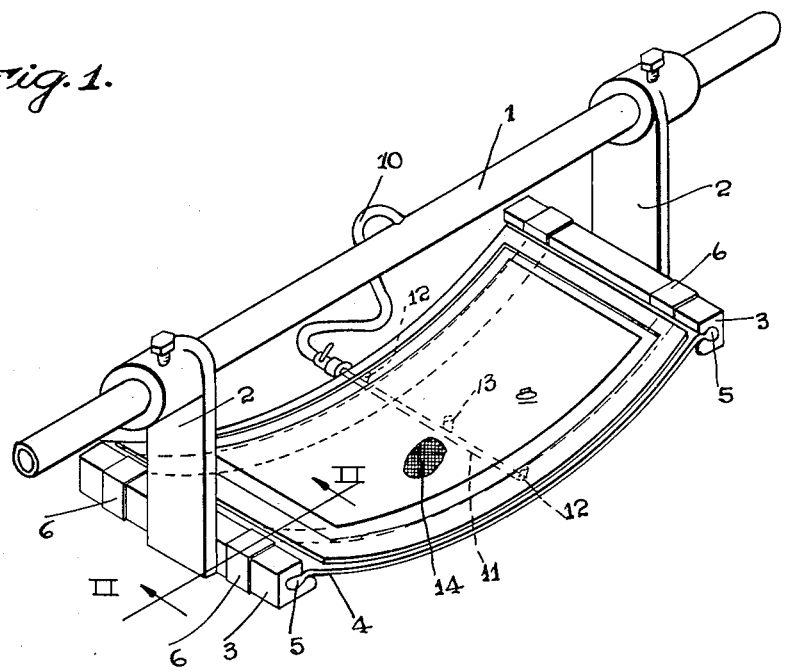
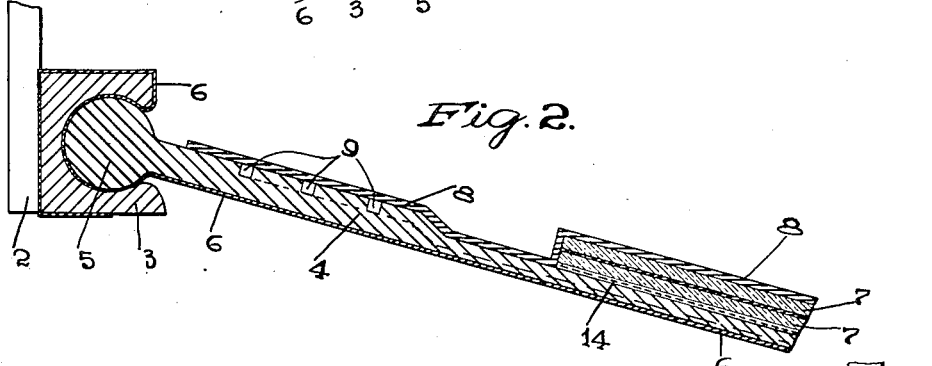
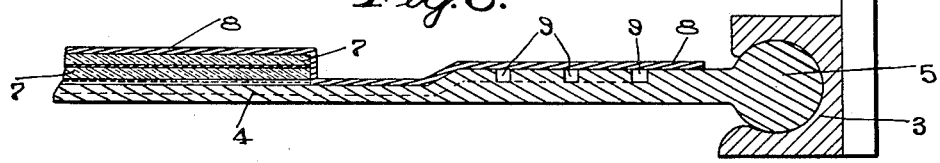
INVENTOR
JAMES H. SHERTS
BY
        ATTORNEYS Jan. 28, 1936.  J. H. SHERTS  2,028,928
APPARATUS FOR MAKING LAMINATED GLASS
Filed April 28, 1934  5 Sheets-Sheet 2
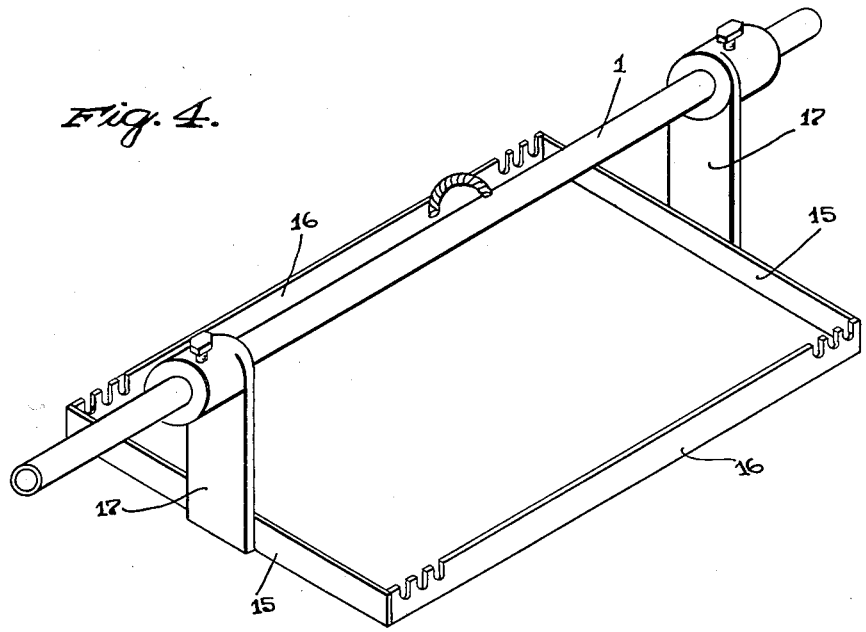
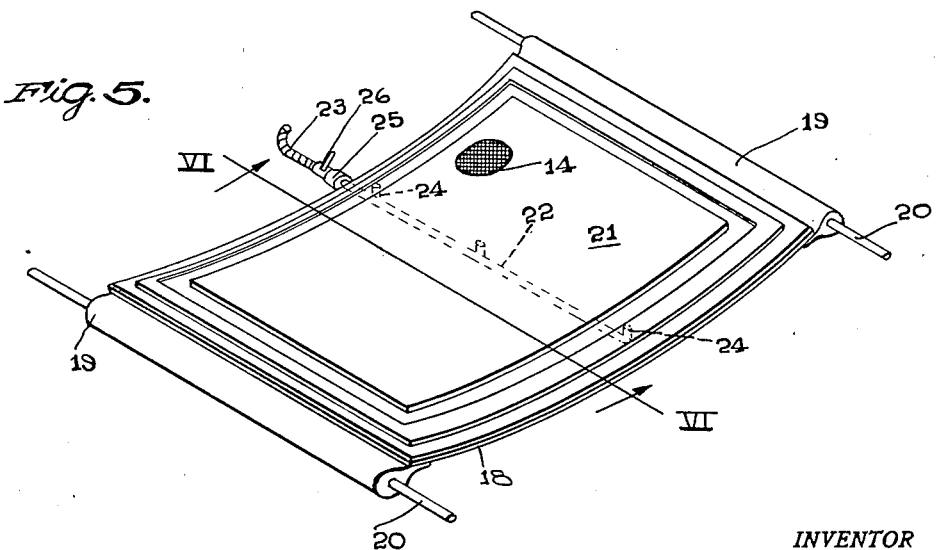
INVENTOR
JAMES H. SHERTS
BY
ATTORNEYS

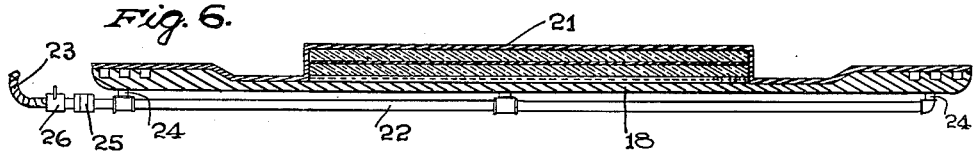
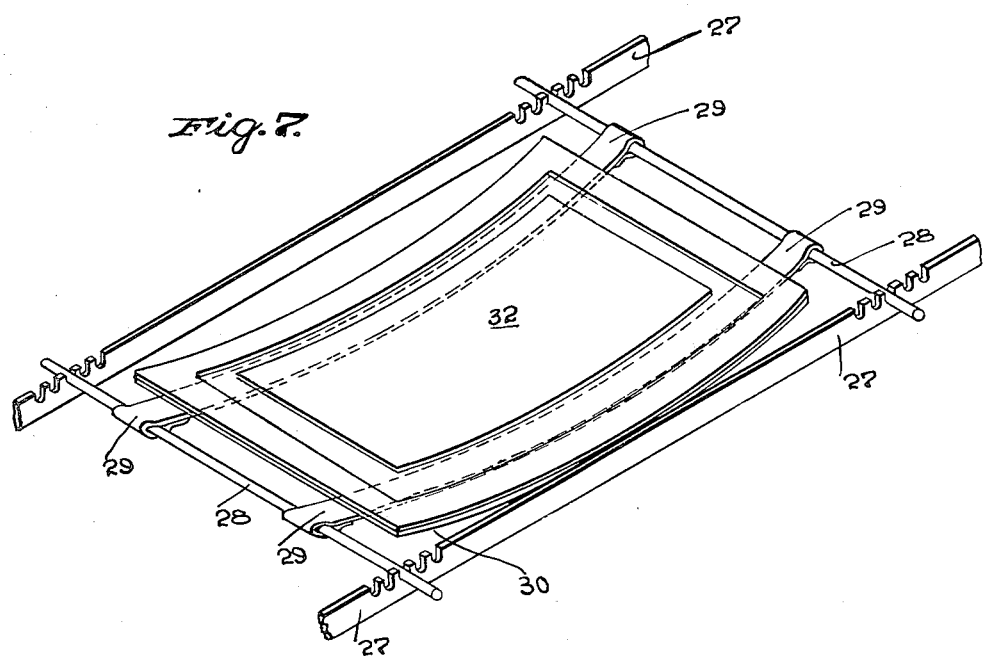
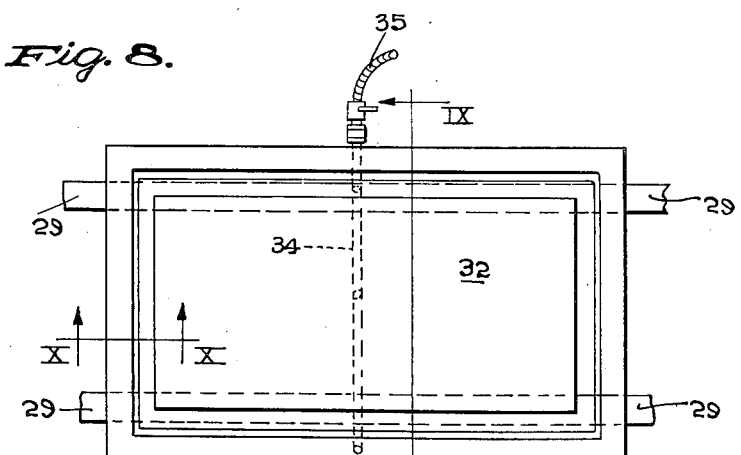

Jan. 28, 1936.  J. H. SHERTS  2,028,928
APPARATUS FOR MAKING LAMINATED GLASS
Filed April 28, 1934  5 Sheets—Sheet 4

INVENTOR
JAMES H. SHERTS
BY
ATTORNEYS

Jan. 28, 1936.　　　　J. H. SHERTS　　　　2,028,928
APPARATUS FOR MAKING LAMINATED GLASS
Filed April 28, 1934　　　5 Sheets-Sheet 5
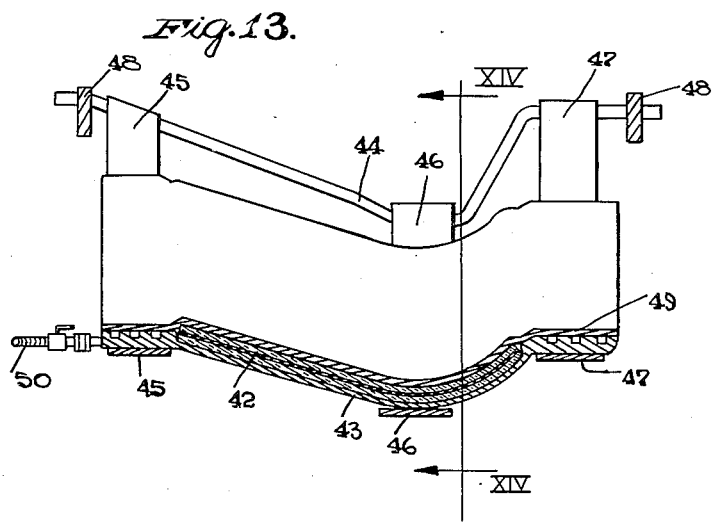
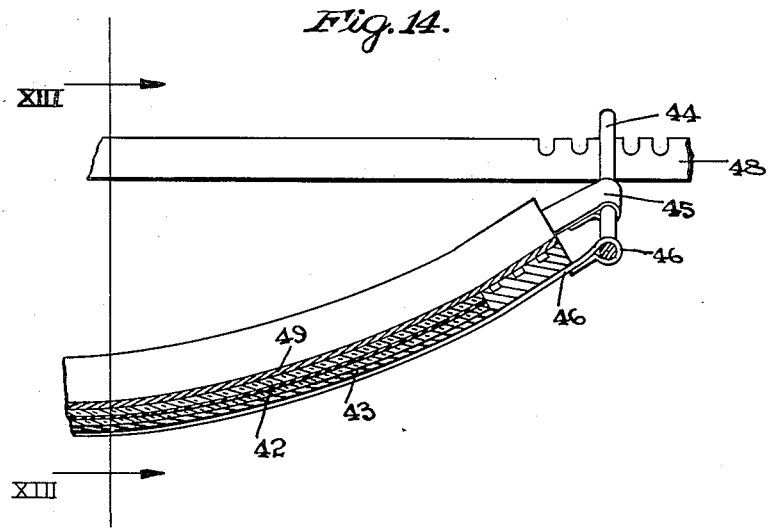
INVENTOR
JAMES H. SHERTS
BY Bradley & Bee
ATTORNEYS Patented Jan. 28, 1936

2,028,928

UNITED STATES PATENT OFFICE 2,028,928

APPARATUS FOR MAKING LAMINATED GLASS

James H. Sherts, Tarentum, Pa., assignor to Duplate Corporation, a corporation of Delaware Application April 28, 1934, Serial No. 722,894

6 Claims. (Cl. 49—81)

Figure 9:
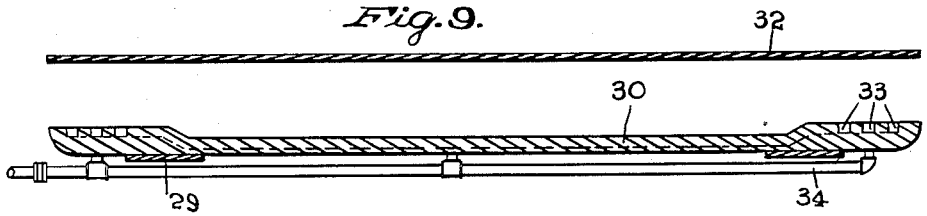
Figure 10:
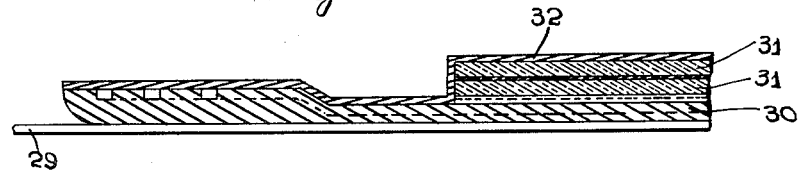
Figure 11:
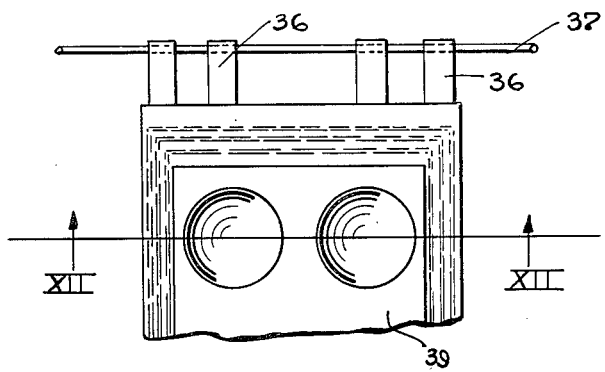
Figure 12:
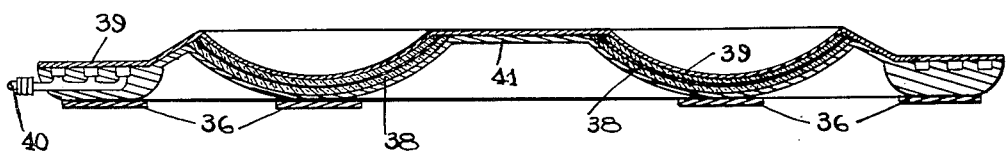

The invention relates to apparatus for making laminated glass of curved shape for use in windshields, automobile side lights and the like, such glass ordinarily comprising a pair of curved glass sheets cemented to the opposite sides of a sheet of reinforcing material, such as cellulose nitrate plastic (celluloid) or cellulose acetate plastic. The construction relates to an apparatus for supporting the assembled curved sheets during the operation of applying heat and pressure thereto and involves a modification of the apparatus for accomplishing this same function, as shown and described in my copending application, Serial No. 711,726, filed February 17, 1934. The apparatus has for its principal objects the provision of an improved support for the sheets of cheap simple construction, which will properly support sheets having a very wide range of curvature, and which may be used with sheets having a curvature in a direction transverse to the sheet, as well as longitudinally thereof. Certain embodiments of the invention are illustrated in the accompanying drawings, wherein:

Figure 1 is a perspective view of one form of apparatus. Fig. 2 is a section on the line II—II of Fig. 1 on an enlarged scale. Fig. 3 is a section similar to that of Fig. 2 of a modification. Figs. 4, 5 and 6 illustrate a further modification, Fig. 4 being a perspective view of a supporting frame, Fig. 5 a perspective view of the apparatus which is supported in the frame, and Fig. 6 a section on the line VI—VI of Fig. 5. Figs. 7, 8, 9 and 10 illustrate another modification, Fig. 7 being a perspective view, Fig. 8 a plan view, Fig. 9 a section on the line IX—IX of Fig. 8, and Fig. 10 a section on the line X—X of Fig. 8. Figs 11 and 12 illustrate another modification, Fig. 11 being a partial plan view and Fig. 12 a section on the line XII—XII of Fig. 11. And Figs. 13 and 14 illustrate another modification, Fig. 13 being a section on the line XIII—XIII of Fig. 14, and Fig. 14 being a section on the line XIV—XIV of Fig. 13.

Referring to the construction as shown in Figs. 1 and 2, I is a supporting pipe carrying the hangers 2, 2. These hangers are securely attached to the end members 3, 3 preferably of metal. Extending between the end members and having a curvature corresponding to the longitudinal curvature of the sheets of glass to be laminated is a rubber base sheet 4 which has beads 5 at its ends fitting into grooves in the end members 3, 3. The base sheet 4 is reinforced by means of a pair of sheet metal bands 6, 6 which extend beneath the base sheet and have their ends bent around the beads 5 and the end members 3, as indicated in Fig. 2.

Supported upon the base sheet is the sandwich to be laminated comprising the glass sheets 7, 7 with an interposed sheet of plastic, the opposing faces of the sheets being prepared for adhesion upon the application of heat and pressure. The cement preferably employed is gelatin, although any other suitable cement may be used. After the sandwich has been placed upon the base sheet 4, it is covered by means of the thin rubber sheet 8, as indicated in Fig. 2. The sheet 4 is provided with the vacuum grooves 9 extending around its periphery and before the laminating operation, the air is exhausted from these grooves and from beneath the sheet 8. This is desirable as the sheets will not laminate property unless the air is withdrawn from between their opposing faces before the application of laminating pressure. The use of the laminating grooves serves to insure a tighter joint between the base sheet 4 and the cover sheet 8 during the laminating operation. This exhaustion of air is accomplished by means of a pipe 10, the upper end of which communicates with the pipe 1. The pipe 1 is connected to a vacuum system similar to that shown in my application heretofore referred to, which constitutes no part of the present invention. Extending beneath the base sheet 4 is a pipe 11 having connections at 12, 12 with the vacuum grooves 9 and connected at 13 with the space between the sheets 4 and 8. In order to prevent the glass sheet 7 which engages the rubber sheet 4 from blocking the upper end of the passage 13, a sheet 14 of copper mesh is preferably placed between the glass sheet and the rubber sheet, as more fully set forth in my application heretofore referred to. It will be understood that this is a desirable expedient and is intended to be used in all the various forms of apparatus illustrated herein.

In carrying out the laminating operation, the apparatus as shown in Fig. 1 is carried down into a body of heated liquid to a depth sufficient to give the necessary heat and pressure and then is removed from this liquid, as set forth in my application, the present invention having to do merely with the apparatus for supporting the sandwiches for laminating in accordance with the process of my application. Due to the fact that the base sheet 4 is of rubber and is supported only at its ends, it is possible to laminate glass sheets having curvature in two directions. The longitudinal curvature of the base sheet 4 corresponds to the longitudinal curvature of the glass sheets to be laminated, and this can be regulated to meet varying requirements by adjusting the hangers 2, 2, along the supporting pipe 1. If the glass sheets are also curved transversely, this transverse curve is taken care of since the sides of the base sheet 4 are free and will accommodate themselves to the curvature of the glass sheets.

Fig. 3 illustrates a slight modification of the construction of Figs. 1 and 2, the difference being that in this construction, the supporting bands 6, 6 of the Figs. 1 and 2 construction are omitted, the base sheet 4 being of sufficient strength to carry out the laminating operation without the requirement for any reinforcing.

Figs. 4, 5 and 6 illustrate another modification, in which the pipe 1 supports a rectangular frame comprising the end members 15, 15 and the notched side members 16, 16, such frame being supported from the pipe 1 by means of the hangers 17. The base plate 18 is similar to the base sheet 4 of the Fig. 1 construction except that it has enlarged end portions 19, 19 which receive the rods 20, 20. When the base sheet is assembled with the rectangular frame, the rods 20, 20 fit into the notches in the side bars 16, 16, so that by this means the curvature of the base sheet may be adjusted to meet the requirement of laminating glass sheets having different degrees of curvature. As in the construction of Fig. 1, air is exhausted from between the cover sheet 21 and the base sheet 18 by means of the pipe 22 which is connected to the pipe 1 by means of the flexible pipe 23. The pipe 22 also has connections 24, 24 leading through the base sheet to the vacuum grooves therein which are similar to those shown in Fig. 2. The pipe 22 is secured to the pipe 23 by means of the coupling 25 and the pipe 23 is provided with a suitable valve 26.

Figs. 7 to 10 illustrate a further modification, in which the supporting frame consists of the notched side members 27, 27 and the end rods 28, 28. The side members are connected by end members (not shown) supported by means of hangers upon a vacuum pipe similar to that shown in Figs. 1 and 4. In order to form a support for the base sheet, two metal bands 29, 29 are employed, such bands being of relatively thin metal so that they may bend to any desired curvature. Lying loosely upon the bands 29, 29 is the rubber base sheet 30, shown in section in Fig. 10. The glass sheets 31 are placed upon this base sheet and covered by the rubber sheet 32, as in the other forms of construction. The base sheet 30 is provided with vacuum grooves 33 and air is exhausted from these grooves and from the space between the sheets 30 and 32 by means of the pipe 34 which is connected to a flexible vacuum pipe 35, as in the other forms of construction. This apparatus is particularly adapted for laminating glass sheets having curvature in two directions since the base sheet 30 is entirely free to shape itself to the curvature of the glass sheets.

Figs. 11 and 12 illustrate a modification similar to that of Figs. 7 to 10, in which the base sheet is supported upon four metal bands 36 having their ends hooked around end bars 37 similar to those of the Figs. 7 to 10 construction. These figures illustrate the apparatus as used for laminating cup-shaped safety glass members 38, 38. The usual cover sheet 39 is employed, and when air is exhausted by means of the vacuum connection 40, the base sheet 41 and cover sheet 39 conform themselves to the shape of the articles, as indicated in Fig. 12. In this form of construction, the base sheet 41 is made relatively thin, and for this reason requires the support of a number of spaced bands 36. When this apparatus is used, a considerable number of small articles may be laminated at one time.

Figs. 13 and 14 illustrate a modification particularly designed to laminate glass sheets 42 into windshields having distinct curvatures in two different directions. In order to permit the base sheet 43 to accommodate itself readily to these curvatures, the end bars 44, which correspond to the end bars 28, 28 of the Fig. 7 construction, are bent into the shape illustrated in Fig. 13 and are connected by the thin metal bands 45, 46 and 47 which hook over the end bars at their ends. These end bars are supported in notches in side frame members 48, 48 similar to the side bar members 27, 27 of Fig. 7. Air is exhausted from between the base sheet 43 and the top sheet 49 by means of the vacuum hose connection 50 similar to those already described. In this case and in the Fig. 11 construction, the vacuum pipe is connected only to the vacuum grooves, but these grooves are connected to the space carrying the glass sheets, which expedient may be employed in the other forms of construction, if desired. It will be apparent that by suitable adjustment of the end and side bars and by the use of base sheets which are free to yield in all directions, the apparatus may be used to laminate glass sheets of almost any desired curvature, the range of use in this respect being substantially wider than that of the apparatus of my application heretofore referred to.

What I claim is:

1. In combination in apparatus for making curved laminated glass, a base sheet of rubber supported so that it has longitudinally substantially the curvature of the glass sheets to be laminated with its side edges free to move toward each other, a flexible sheet of rubber having its edges free adapted to fit over the glass sheets carried upon the base sheet and engage the base sheet outside the edges of the glass sheets, and means for exhausting the air from the space between the rubber sheets.

2. In combination in apparatus for making curved laminated glass, a base sheet of rubber supported at its ends so that it has substantially the curvature of the glass sheets to be laminated with all of its side edges free to move toward each other, a flexible sheet of rubber having its edges free adapted to fit over the glass sheets carried upon the base sheet and engage the base sheet outside the edges of the glass sheets, and means for exhausting the air from the space between the rubber sheets.

3. In combination in apparatus for making curved laminated glass, a rectangular frame having side and end members, supporting strips extending between the end members and having substantially the curvature of the glass sheets to be laminated, a base sheet of rubber supported on the strips so as to move freely in all directions thereon, a flexible sheet of rubber having its edges free adapted to fit over the glass sheets carried upon the base sheet and engage the base sheet outside the edges of the glass sheets, and means for exhausting the air from the space between the rubber sheets.

4. In combination in apparatus for making curved laminated glass, a rectangular frame having side and end members with the end members adjustable toward and from each other, supporting strips extending between the end members and having substantially the curvature of the glass sheets to be laminated, a base sheet of rubber supported on the strips so as to move freely thereon in all directions, a flexible sheet of rubber having its edges free adapted to fit over the glass sheets carried upon the base sheet and engage the base sheet outside the edges of the glass sheets, and means for exhausting the air from the space between the rubber sheets.

5. In combination in apparatus for making curved laminated glass, a rectangular frame having side and end members, a base sheet of rubber secured at its ends to the end members and curving downward between such members to correspond to the curvature of the glass sheets to be laminated with its side edges free to move toward each other, a flexible sheet of rubber having its edges free adapted to fit over the glass sheets carried upon the base sheet and engage the base sheet outside the edges of the glass sheets, and means for exhausting the air from the space between the rubber sheets.

6. In combination in apparatus for making curved laminated glass, a rectangular frame having side and end members, with such end members adjustable toward and from each other, a base sheet of rubber secured at its ends to the end members and curving downward between such members to correspond to the curvature of the glass sheets to be laminated with its side edges free to move toward each other, a flexible sheet of rubber having its edges free adapted to fit over the glass sheets carried upon the base sheet and engage the base sheet outside the edges of the glass sheets, and means for exhausting the air from the space between the rubber sheets.

JAMES H. SHERTS.